Patented Feb. 3, 1948

2,435,204

UNITED STATES PATENT OFFICE 2,435,204

HERBICIDES

John H. Davidson, United States Navy, South Haven, Mich., assignor to The Dow Chemical Company, Midland, Mich., a corporation of Delaware No Drawing. Application September 13, 1943, Serial No. 502,163

1 Claim. (Cl. 167—45)

The present invention is directed to new herbicide compositions and to a method for their use in destroying plant growth. The invention is particularly concerned with plant treatment compositions which, on application to the exterior of the plant, are at least partially absorbed into the circulatory system thereof, whereby the destruction of the plant is accomplished.

Many organic and inorganic compositions have been suggested for use as herbicides and for retarding or otherwise regulating plant growth. Commonly accepted materials for the control of undesirable vegetation are the inorganic chlorates and salts of dinitro-phenol. These materials are disadvantageous for use by reason of the highly flammable nature of deposits thereof on dead vegetation. Also, each is objectionable from the point of view of the operator, since residues on clothing are so flammable as to constitute a serious hazard. Furthermore, aqueous solutions of the chlorates are very corrosive to metal containers and applicators, whereby specialized equipment is required for their handling.

Similar disadvantages accrue to the conventional use of heavy petroleum oils for the control of vegetation. Here, the oily non-volatile residues remaining on the vegetation constitute a fire hazard, and those portions of the treating material deposited in and on the soil interfere with its subsequent utilization. Also, it has been found that oil has little effect upon the root systems of noxious weeds, trees, and shrubs, whereby a superficial control may be followed by the growth of suckers or the resprouting of the unaffected root systems.

It is among the objects of the present invention to provide an improved procedure for the destruction of plant growth. Another object is to provide herbicide compositions, deposits of which will be sufficiently impermanent as not to be objectionable from the point of view of flammability or residual toxicity. Other objects will become apparent from the following description.

According to the present invention, it has been discovered that the liquid lower aliphatic bromides have herbicidal properties, and that, when applied to weeds, trees, or shrubs, such bromides are sufficiently absorbed in the circulatory system of the plant that an effect is exerted over the entire plant regardless of the initial point of application. The organic bromides are employed in amount sufficient to cause an herbicidal effect. Proper and timely application of such herbicidal material results in the killing of the treated plant and the control of borers, nematodes, and other organisms present in and on the treated plant or in the soil adjacent thereto and contacted with either the liquid bromide or vapors thereof. Deposits of the herbicide in or on the plant and adjacent soil exert an effect over a considerable period of time, yet are sufficiently volatile that no permanent residue is left to poison the soil. Also, the use of these materials does not impart undesirable flammability characteristics to the dried cellulosic plant structure.

The expression "liquid lower aliphatic bromides" as herein employed, refers to aliphatic compounds containing not to exceed 6 carbon atoms and boiling at 150° C. or lower at atmospheric pressure. Included within the scope of the expression are alkyl bromides such as ethyl-bromide, propyl-bromides, butyl-bromides, amyl-bromides, and certain of the hexyl-bromides; alkenyl bromides such as allyl-bromide and methallyl-bromide; and alkylene bromides such as ethylene-bromide and propylene-bromide.

When operating in accordance with the invention, the aliphatic bromide may be employed without modification. In a further embodiment, the bromide is dissolved in a less volatile solvent, and preferably one boiling above 150° C., to obtain an herbicidal composition. Other embodiments include the use of aqueous emulsions of the liquid lower aliphatic bromides or of emulsions of solutions of such bromides in other organic liquids. The amount of effective agent employed varies with the particular bromide concerned, the form of the composition, the time in the growing season in which treatment is to be made, and the variety and age of plant to be treated. With a preferred effective agent, ethylene bromide, from about 0.5 fluid ounce to a quart or more is employed per tree or shrub, depending upon the size, age, and general condition of the latter. For the control of grass or weeds, any required amount of the material may be sprayed or poured over the area in which it is desired to obtain the herbicidal effect. When a less volatile solvent is employed as a carrier for the bromide, the amount of the latter employed are from about 3 to 30 per cent or higher by weight of the ultimate solution. When the bromide or a solution thereof is to be emulsified with water, an amount of the ultimate composition containing the indicated amount of bromide is used to kill vegetation.

The method as described may be carried out at any time during the growing season. An optimum effect is exerted upon the roots when the plant is treated in the fall or near the end of the normal growing season. The leaves, branches, stalks, etc., are most rapidly killed when the herbicide is applied in the spring. In any event, both the roots and aerial portions are affected, but with somewhat selective results occurring during the indicated periods.

While the bromide compounds per se or simple solutions and emulsions may be employed in accordance with the present invention, it is to be understood that such products may be further modified by dissolving or dispersing in the herbicidal product a resin or plastic material such as polystyrene in amount sufficient to reduce the flow characteristics and impart viscous film-forming properties to the herbicidal product.

The exact point of application of any of the compositions as described above is not critical, since, by reason of the absorption of at least a portion of the organic bromide into the sap stream, the desired result may be obtained by treatment of either root or aerial portions of the plant. Thus the roots and adjacent soil may be contacted with the effective composition, or the composition may be sprayed or otherwise applied to stalk, trunk, branches or leaves of the plant. In operation, it has been found convenient to apply the composition to the soil immediately adjacent to the stalk or trunk.

Following application of the herbicide to the tree surfaces or roots, there is a darkening or browning of the cambium layer accompanied by a withering and shrinking of foliage. This latter result becomes apparent as the herbicide is circulated through the plant from the point of application to the extremities of the root and aerial systems. When the application is made at the base of the plant or in the soil adjacent thereto, the herbicidal effect is accompanied by a control of borers, nematodes, and other organisms susceptible to the bromide constituent.

The following examples are illustrative but are not to be construed as limiting the invention.

EXAMPLE 1

Ethylene bromide was applied in the late fall to the soil at the base of the trunks or stems of a variety of trees and shrubs. Representative results were obtained in operating with this material for the control of wild cherry, sumac, and sassafras. The wild cherry bushes treated had stems ranging from ½ to 1½ inches in diameter. The sumac was from 1 to 2½ inches in diameter. The sassafras trees were of from 3 to 6 inches in diameter at the butt. In operation, a measured amount of the ethylene bromide was distributed around the base of each tree or bush. The test plants and trees were inspected periodically to ascertain the effect of the treatment upon their normal development during the following spring and summer. After 9 months, representative plants were dug up and the roots carefully examined to ascertain the distance from point of application over which the treatment was effective. Control determinations were made with carbon bisulfide.

In treatments where a 25 milliliter portion of the ethylene bromide was applied to each plant, a 100 per cent kill of all plants was obtained. The kill of roots on sassafras extended 18 inches from the point of application. Cherry roots were killed 11 inches from the base of the plant. On sumac the kill extended an average of 13 inches from point of application. When a 50 milliliter portion of the ethylene bromide was applied to each plant, a 100 per cent kill was obtained. On sassafras the roots were killed 15 inches each way from point of application. Cherry roots were killed 16 inches from the point of application. Sumac roots were dead for a distance of 19 inches from the base of the stem. 100 milliliter portion applications killed 100 per cent of the plants and accomplished a kill of sassafras roots 21 inches each way from the point of application. Cherry roots were killed 29 inches each way from the butt of the plant, and sumac 20 inches. None of the plants treated with ethylene bromide sent up new buds or suckers. Also, root systems of the grass and other succulent vegetation adjacent to the point of application were killed.

In comparison, 25 milliliter portions of carbon bisulfide gave no kill against sassafras and sumac. As far as could be determined, the root systems of the treated plants were unaffected. 50 milliliter portions of carbon bisulfide gave an apparent kill of 100 per cent against sassafras and 75 per cent against sumac by girdling. However, the sassafras roots were not perceptibly affected and sent up a profusion of sucker growth around the base of the original plant. The roots of sumac were affected but superficially.

EXAMPLE 2

1 part by weight of ethylene bromide was dissolved in 4 parts of $\beta\beta'$-dichloro-diethyl ether to form an herbicide composition. This mixture was applied substantially as described in Example 1 to kill sassafras, cherry and sumac trees. A dose of from 25 to 100 milliliters of the mixture per tree gave 100 per cent kill. 9 months after the time of application, the roots of sassafras, originally treated at the base with 25, 50 and 100 milliliter portions of the herbicide mixture, were found to have been killed to a distance of 12, 31 and 36 inches, respectively, from the point of application. Wild cherry, when similarly treated, showed a kill of roots to a distance of 7, 8 and 15 inches, respectively, from the point of application. A similar result was obtained with sumac. None of the treated plants showed any inclination to send up suckers during the growing season following application.

EXAMPLE 3

A composition was prepared by mixing together 1 part of isopropylbenzene with 1 part of ethylene bromide. The application of 25, 50 and 100 milliliter portions of this mixture to the base of cherry, sumac and sassafras gave 100 per cent kill with no sucker growth being sent up from the roots during the growing season following treatment. The root kills on sassafras for the 25, 50 and 100 milliliter portion treatments were 6, 15 and 17 inches, respectively, from the base of the trees. Observed kills for the roots of cherry on similar treatment were 6, 13 and 15 inches, respectively, from the point of application. The kill of sumac roots was accomplished at distances of 12, 19 and 23 inches, respectively, from the point of contact.

A similar composition in which 1 part of ethylene bromide was dispersed in 4 parts of isopropylbenzene was applied against sumac in 25, 50 and 100 milliliter portions per tree to give 100 per cent kill of the shrubs and a kill of roots at distances of 9, 8 and 14 inches, respectively, from the point of application.

Against sassafras the 25 milliliter portion treatment gave 80 per cent kill, and the 50 and 100 milliliter portions 100 per cent kill. The 50 and 100 milliliter portion treatments killed the root systems of the trees at distances of 8 and 9 inches, respectively, from the point of application.

Control determinations were carried out with isopropylbenzene alone and with a solution of 1 part of chloropicrin in 4 parts of isopropylbenzene. At a dosage of 25 milliliters per tree, isopropylbenzene gave a kill of but 20 per cent against sassafras and 60 per cent against sumac. The effect against roots was negligible. When each tree was treated with a 50 milliliter portion of isopropylbenzene, a 40 per cent kill of sassafras and an 80 per cent kill of sumac was obtained. The root systems of the sassafras trees were not affected. With sumac, the cambium layer of the root was somewhat browned for a short distance from the point of application. With a 100 milliliter portion of isopropylbenzene per tree, a 60 per cent kill of sassafras was obtained without any appreciable affect on the root system. At all concentrations of isopropylbenzene, the roots of treated sassafras sent up new sprouts and suckers, even in those instances where the aerial portion of the plant appeared to be affected by the treatment.

When a solution of one part of chloropicrin in 4 parts of isopropylbenzene were used, somewhat similar results were obtained. Here the kills against sassafras and sumac were better than with isopropylbenzene alone. However, even at a dosage as high as 100 milliliters per tree, sassafras root systems continued to send up sprouts and suckers.

EXAMPLE 4

1 part of ethylene bromide was dissolved in 4 parts of ethylbenzene, and this mixture applied as previously described to sassafras and sumac. 100 per cent kill of the treated trees and bushes was obtained with 25, 50 and 100 milliliter portions of the mixture with no apparent tendency for the root systems of the plants to send up new sprouts and suckers. On sassafras, the roots were killed at 2, 8 and 16 inch distances, respectively, from the point of application, and on sumac at 7, 14 and 18 inch distances, respectively, as a result of the application of the 25, 50 and 100 milliliter portions of material at the bases of the plants.

Other compositions which may be prepared simply by mixing liquid organic bromides with suitable high boiling solvent materials include the following:

Composition A

| Compound | Parts by Weight |
|---|---|
| ββ'-Dichloro-dipropyl ether | 63 |
| Methylene bromide | 27 |
| Polystyrene | 10 |

This composition is adapted to be employed for application to either the aerial portion of the plant or adjacent to its stem, and is characterized by its high viscosity, whereby it does not tend appreciably to flow from the point of application.

Composition B

| Compound | Parts by Weight |
|---|---|
| Secondarybutyl bromide | 30 |
| Ethyl naphthalene | 70 |

Composition C

| Compound | Parts by Weight |
|---|---|
| Ethylene bromide | 25 |
| Tertiarybutyl bromide | 25 |
| o-Dichlorobenzene | 50 |

This composition is highly toxic to borer and related insect pests, whereby the control of such organisms is accomplished in the soil and on the treated plant along with the killing of the latter.

Composition D

| Compound | Parts by Weight |
|---|---|
| Ethyl bromide | 60 |
| α-chloronaphthalene | 40 |

Other effective agents which may be employed in accordance with the present invention and particularly as described in the foregoing examples and compositions include n-propyl bromide, isopropyl bromide, n-butyl bromide, n-amyl bromide, secondaryamyl bromide, tertiaryamyl bromide, isohexyl bromide, allyl bromide, and methallyl bromide. While any of these compounds or mixtures thereof may be employed as described in the examples, they may also be used in aqueous emulsion or otherwise as desired. Additional high boiling solvents which may be substituted for those previously disclosed are diethylbenzene, ethylene glycol, xylene, light mineral oil, liquid hexahydronaphthalene, or mixtures of 2 or more of such solvent mixtures.

The present application is a continuation-in-part of copending application Serial No. 455,614, filed August 21, 1942, now Patent No. 2,380,416.

I claim:

A method for killing trees and shrubs which includes applying to the base of the plant at soil level an herbicide composition comprising as the principal effective ingredient ethylene bromide.

JOHN H. DAVIDSON.

REFERENCES CITED

The following references are of record in the file of this patent:

UNITED STATES PATENTS

| Number | Name | Date |
|---|---|---|
| 2,110,842 | Ressler | Mar. 8, 1938 |
| 2,156,789 | Missbach | May 2, 1939 |